United States Patent
Chen

(10) Patent No.: US 11,861,451 B2
(45) Date of Patent: Jan. 2, 2024

(54) METHOD FOR CHIP COLLECTION AND METHOD FOR CHIP POSITIONING

(71) Applicant: CHANGXIN MEMORY TECHNOLOGIES, INC., Hefei (CN)

(72) Inventor: Yui-Lang Chen, Hefei (CN)

(73) Assignee: CHANGXIN MEMORY TECHNOLOGIES, INC., Hefei (CN)

(*) Notice: Subject to any disclaimer, the term of this patent is extended or adjusted under 35 U.S.C. 154(b) by 0 days.

(21) Appl. No.: 17/903,335

(22) Filed: Sep. 6, 2022

(65) Prior Publication Data

US 2022/0414360 A1    Dec. 29, 2022

Related U.S. Application Data

(63) Continuation of application No. PCT/CN2022/070496, filed on Jan. 6, 2022.

(30) Foreign Application Priority Data

Jan. 8, 2021  (CN) .......................... 202110026098.8

(51) Int. Cl.
*G06K 7/14* (2006.01)
*G06T 7/11* (2017.01)
(Continued)

(52) U.S. Cl.
CPC ......... *G06K 7/1443* (2013.01); *G06K 7/1417* (2013.01); *G06T 3/40* (2013.01);
(Continued)

(58) Field of Classification Search
None
See application file for complete search history.

(56) References Cited

U.S. PATENT DOCUMENTS

| | | | |
|---|---|---|---|
| 9,361,540 B2 | 6/2016 | Garcia Morato Fernandez Baillo | |
| 2014/0050401 A1* | 2/2014 | Garcia Morato Fernandez Baillo | G06V 10/50 |
| | | | 382/173 |

FOREIGN PATENT DOCUMENTS

| | | |
|---|---|---|
| CN | 202632312 U | 12/2012 |
| CN | 104881665 A | 9/2015 |

(Continued)

OTHER PUBLICATIONS

Wang Wenping, "Halcon-Based Chip Character Recognition", Information & Technology(Master), China Master's Theses Full-text Database, No. 04, Apr. 15, 2019 (Apr. 15, 2019), ISSN: 1674-0246, the abstract, 72 pages.

(Continued)

*Primary Examiner* — Kristy A Haupt
(74) *Attorney, Agent, or Firm* — Cooper Legal Group, LLC

(57) ABSTRACT

A method for chip collection and a method for chip positioning are provided. The method for chip collection includes that: an image to be detected is obtained; chip position information of a comparison image with a highest matching degree with the image to be detected is obtained from a database; a position of each of detection regions in the image to be detected is obtained based on the chip position information; an image of the detection region is obtained based on the position of each detection region; it is determined whether the image of the detection region includes the chip code image; and when the image of the detection region includes the chip code image, a chip code corresponding to the chip code image identified and the chip code is stored in the database.

16 Claims, 11 Drawing Sheets

(51) Int. Cl.
*G06T 7/70* (2017.01)
*G06V 10/74* (2022.01)
*G06T 3/40* (2006.01)

(52) U.S. Cl.
CPC .................. *G06T 7/11* (2017.01); *G06T 7/70* (2017.01); *G06V 10/74* (2022.01); *G06T 2207/20021* (2013.01); *G06T 2207/30242* (2013.01)

(56) References Cited

FOREIGN PATENT DOCUMENTS

| CN | 105046271 A | 11/2015 |
| CN | 105404900 A | 3/2016 |
| CN | 111274961 A | 6/2020 |
| CN | 112101060 A | 12/2020 |

OTHER PUBLICATIONS

Guo Xiaofeng, Al. "IC chip character segmentation and recognition method based on geometric features", CAAI Transactions on Intelligent Systems, vol. 15 No. 1, Jan. 31, 2020, ISSN: 1673-4785, pp. 144-151.
International Search Report in the international application No. PCT/CN2022/070496, dated Mar. 15, 2022, 8 pages.

* cited by examiner

METHOD FOR CHIP COLLECTION AND METHOD FOR CHIP POSITIONING

CROSS-REFERENCE TO RELATED APPLICATION

This application is a continuation of International Application No. PCT/CN2022/070496, filed on Jan. 6, 2022, which claims priority to Chinese Patent Application No. 202110026098.8, filed on Jan. 8, 2021. The contents of International Application No. PCT/CN2022/070496 and Chinese Patent Application No. 202110026098.8 are hereby incorporated by reference in their entireties.

BACKGROUND

In manufacturing semiconductors, chips on a chip tray are calibrated and identified mainly by obtaining chip codes, and the chip codes need to be collected by high-priced laser cameras. The image shooting range of the laser cameras is small, and only one chip code can be collected in a single acquisition.

At present, the codes of the chips on the chip tray are collected mainly by manually controlling the laser cameras. The number of the chips on the chip tray is large, and if only one chip code can be collected at a time, it will consume a lot of detection time, which is not beneficial to the batch output of the chips. Further, manual operation is prone to the problems of missing collection, repeated collection and wrong positional sequence collection of the chips. How to automatically collect the codes on the chips is an urgent problem to be solved in the semiconductors manufacturing process.

SUMMARY

Embodiments of the disclosure relate to the technical field of semiconductor detection and provide a method for chip collection and a method for chip positioning.

In a first aspect, an embodiment of the disclosure provides a method for chip collection, including the following operations. An image to be detected is obtained, the image to be detected includes chip code images, and each chip code image is configured to identify a respective one of semiconductor chips. Chip position information of a comparison image with a highest matching degree with the image to be detected is obtained from a database, the chip position information is configured to indicate a position of each semiconductor chip in the comparison image. A position of each of detection regions in the image to be detected is obtained based on the chip position information, each detection region is configured to indicate a position of a respective one of chip code images. An image of the detection region is obtained based on the position of each detection region. It is determined whether the image of the detection region includes the chip code image; and when it is determined that the detection region includes the chip code image, a chip code corresponding to the chip code image is identified and the chip code is stored in the database.

In a second aspect, an embodiment of the disclosure further provides a method for chip positioning, to obtain the chip position information in the method for chip collection. The method for chip positioning includes the following operations. An image to be positioned is obtained by a positioning device; the image to be positioned is divided into regions to obtain multiple sub-positioning images, where each sub-positioning image includes a respective chip; a position of the respective chip in each sub-positioning image is obtained; and the chip position information of the image to be positioned is obtained based on the respective position of the chip in each sub-positioning image and a position of each sub-positioning image in the image to be positioned.

BRIEF DESCRIPTION OF THE DRAWINGS

One or more embodiments will be illustrated with reference to the corresponding figures in the drawings, which are not limited to scale unless specifically defined.

DETAILED DESCRIPTION

At present, codes of chips on a chip tray are collected mainly by manually controlling laser cameras. The number of the chips on the chip tray is large, and if only one chip code can be collected at a time, it will consume a lot of detection time, which is not beneficial to the batch output of the chips. Further, manual operation is prone to problems of missing collection, repeated collection and wrong positional sequence collection of the chips.

An embodiment of the disclosure provides a method for chip collection, including the following operations. An image to be detected is obtained, the image to be detected includes chip code images, and each chip code image is configured to identify a respective one of semiconductor chips. Chip position information of a comparison image with a highest matching degree with the image to be detected is obtained from a database, the chip position information is configured to indicate a position of each semiconductor chip in the comparison image. A position of each of detection regions in the image to be detected is obtained based on the chip position information, each detection region is configured to indicate a position of a respective one of chip code images. An image of the detection region is obtained based on the position of each detection region. It is determined whether the image of the detection region includes the chip code image; and when it is determined that the detection region includes the chip code image, a chip code corresponding to the chip code image is identified and the chip code is stored in the database.

To make the objectives, technical solution and advantages of the embodiments of the disclosure to be understood more clearly, the embodiments of the disclosure will be illustrated in detail below with reference to the drawings. It should be understood by those of ordinary skill in the art that numerous technical details according to the embodiments of the disclosure will be illustrated for a better understanding of the disclosure. However, even without the technical details and variations and modifications based on the following embodiments, the technical solution of the disclosure may be further implemented. The following embodiments are divided for convenient description of the disclosure, which are not intended to limit the specific implementations of the disclosure. The embodiments may be combined with and referred to each other on a non-conflict basis.

Figure 1:
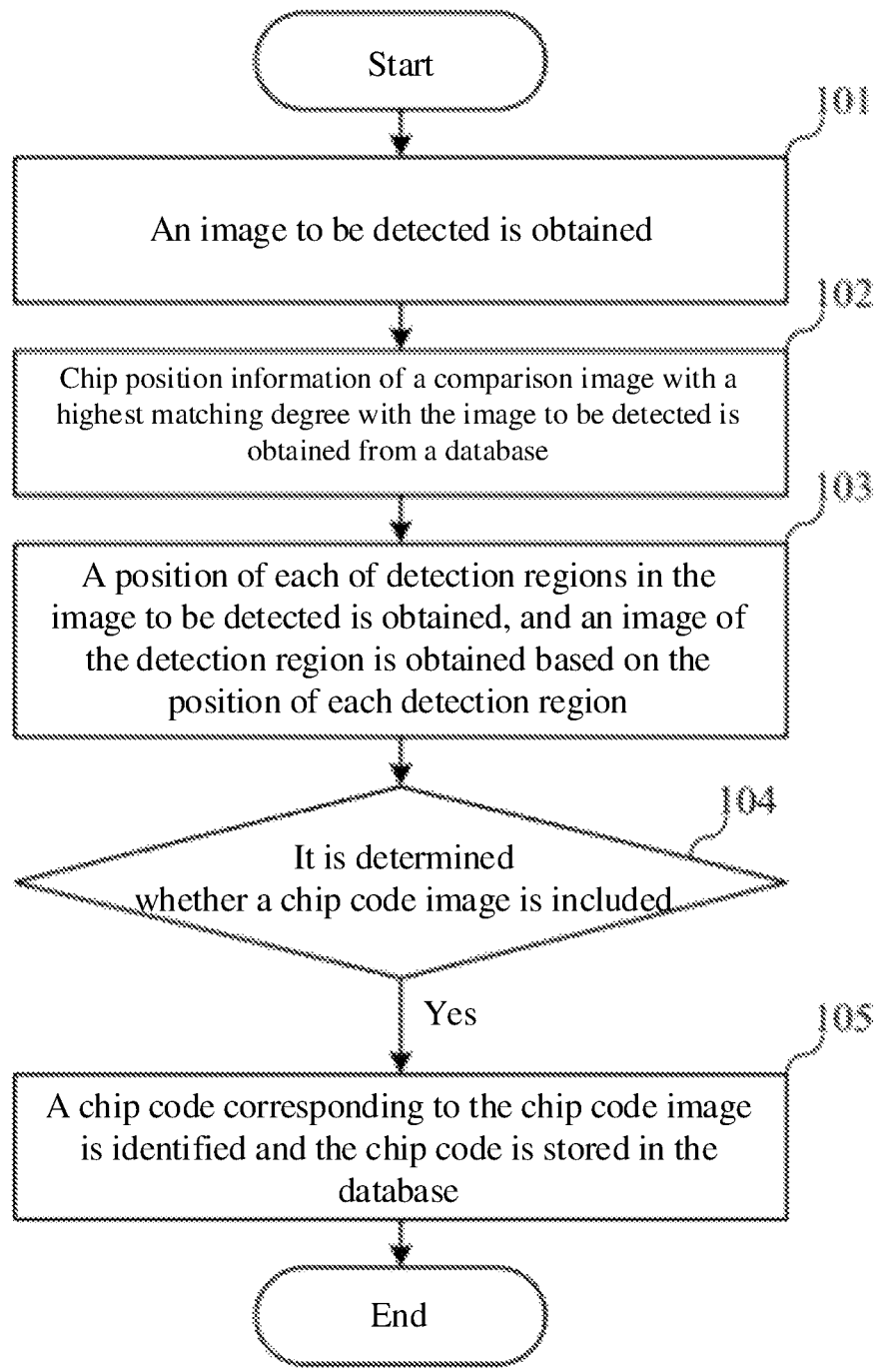
FIG. 1 is a schematic flowchart of a method for chip collection according to an embodiment of the disclosure.
Figure 2:
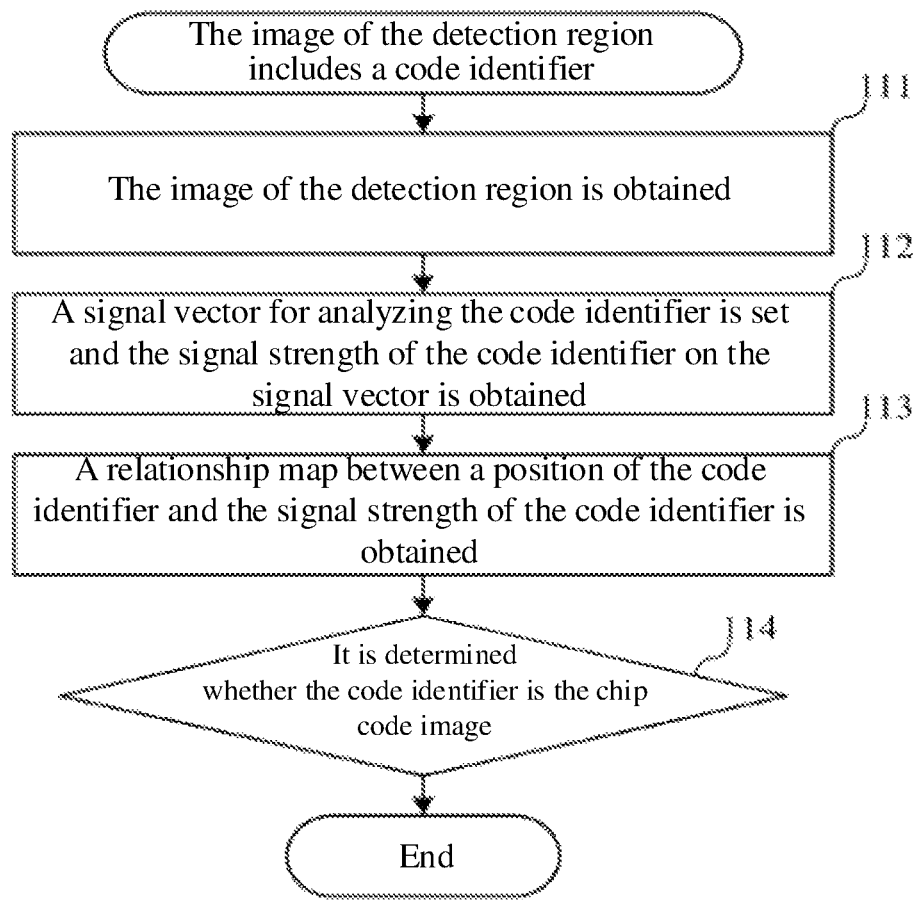
FIG. 2 is a schematic flowchart for determining whether the chip code image is included according to an embodiment of the disclosure.
Figure 3:
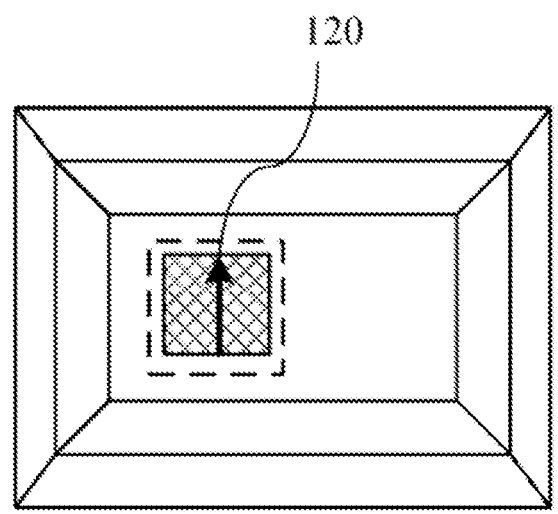
FIG. 3 is a schematic diagram of a signal vector according to an embodiment of the disclosure.
Figure 4:
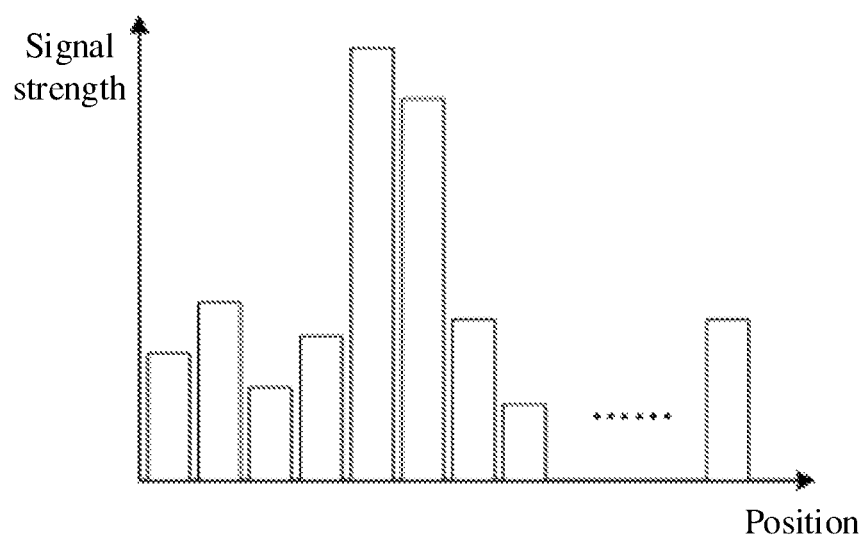
FIG. 4 is a diagram of the relationship map between the position of the code identifier and the signal strength of the code identifier according to an embodiment of the disclosure.

FIG. 1 is a schematic flowchart of a method for chip collection according to an embodiment, FIG. 2 is a schematic flowchart for determining whether the chip code image is included according to the embodiment, FIG. 3 is a schematic diagram of a signal vector according to the embodiment, and FIG. 4 is a diagram of the relationship map between the position of the code identifier and the signal strength of the code identifier according to the embodiment. The method for chip collection according to the embodiment of the disclosure will be illustrated in detail below with reference to the drawings.

With reference to FIG. 1, the method for chip collection includes the following operations.

At block 101, an image to be detected is obtained.

The image to be detected is obtained, the image to be detected includes chip code images and each chip code image is configured to identify a respective one of semiconductor chips.

Specifically, the image to be detected is an obtained image of a chip tray, the image to be detected includes multiple chip code images, each of the chip code images includes a respective chip code configured to calibrate and identify semiconductor chips. In an example, the chip codes include multiple general purpose formats, such as Code-128, Data-Matrix, QR-Code, etc.

At block 102, chip position information of a comparison image with a highest matching degree with the image to be detected is obtained from a database.

The chip position information of the comparison image with the highest matching degree with the image to be detected is obtained from the database, the chip position information is configured to indicate a position of each semiconductor chip in the comparison image.

Specifically, the chip position information of multiple comparison images is stored in the database. First, a matching degree of the image to be detected with each comparison image is obtained, and each matching degree is configured to represent the similarity between the image to be detected and the corresponding comparison image; and the chip position information of the comparison image with the highest matching degree with the image to be detected is obtained based on each matching degree, and the chip position information is configured to indicate the position of the semiconductor chip in the comparison image.

In an example, the size of a chip tray is not fixed, but sizes and directions of chips placed on the chip tray are fixed. Due to the fact that a numbers of chips in a longitudinal direction and a number of chips in a transverse direction on the chip tray are not fixed, the positions of the chips in the image to be detected and identification sequences of the image to be detected are required to be identified through a comparison object with the highest similarity with the image to be detected.

At block 103, a position of each of detection regions in the image to be detected is obtained, and an image of the detection region is obtained based on the position of each detection region.

The position of the detection region in the image to be detected is obtained based on the chip position information, and the detection region is configured to mark the position of the chip code image; and the image of the detection region is obtained based on the position of the detection region.

Specifically, the chip position information is mapped to the image to be detected based on the chip position information of the comparison image with the highest similarity thereto, the position of the detection region indicated by the chip position information is obtained, and the image of the detection region in the image to be detected is obtained based on the position of the detection region and the image to be detected.

At block 104, it is determined whether a chip code image is included.

It should be noted that, according to other embodiments, before determining whether a chip code image is included in the image of the detection region, the method for chip collection further includes the following operations. It is determined whether a code identifier is included in the image of the detection region; and when it is determined that a code identifier is included in the image of the detection region, the operation of determining whether the chip code image is included in the image of the detection region is performed. The operation that it is determined whether a chip code image is included in the image of the detection region specifically includes it is determined whether the code identifier is the chip code image. By determining whether a code identifier is included in the detection region, and then determining whether the code identifier is the chip code image, the data processing load of a system on determining the image in the detection region is reduced, thereby speeding up the process for identifying the chips.

Specifically, the operation for determining whether a chip code image is included in the image of the detection region includes the following operations.

With reference to FIG. 2, the present embodiment will be described in detail with an example that the image of the detection region includes a code identifier. Specifically, when the image of the detection region includes a code identifier, the method for chip collection according to the embodiment includes the following operations.

At block 111, the image of the detection region is obtained.

The image of the detection region is obtained, and the image of the detection region includes the code identifier.

At block 112, a signal vector for analyzing the code identifier is set and the signal strength of the code identifier on the signal vector is obtained.

Specifically, with reference to FIG. 3, a signal vector 120 for analyzing a code identifier is set in the image of the detection region and the signal strength of the code identifier on the signal vector 120 is obtained.

At block 113, a relationship map between a position of the code identifier and the signal strength of the code identifier is obtained.

Specifically, with reference to FIG. 4, the relationship map between the position of the code identifier and the signal strength of the code identifier is generated based on the signal vector and the signal strength of the code identifier on the signal vector.

It should be noted that according to the embodiment, the relationship map between the position of the code identifier and the signal strength of the code identifier is a bar graph, which is only for illustration. According to other embodiments, the relationship map between the position of the code identifier and the signal strength of the code identifier may be a line graph or a table. It should be understood by those skilled in the art that any diagram illustrating the relationship between the position of the code identifier and the signal strength of the code identifier shall fall within the scope of the disclosure.

Further with reference to FIG. 2, at block 114, it is determined whether the code identifier is the chip code image.

Specifically, whether the code identifier in the image of the detection region is the chip code image is determined based on a signal strength difference between the signal strength of the code identifier in the relationship map and signal strength of the code identifier at a preset position.

The operation for determining whether the code identifier in the image of the detection region is the chip code image includes the following operations.

i is configured to represent a sequential position index value, j is configured to represent a current position index value, $a_n$ is configured to represent signal strength of a code identifier position n, and $d_n$ is configured to represent a determination value of the code identifier position n. When $a_i$ is greater than $a_j$, $d_i=1$, and when $a_i$ is not greater than aj, $d_i=0$.

A1: in an initial state, it is set that i=1 and j=1, and a value of $d_1$ is obtained based on $a_0$ and $a_1$.

A2: i is incremented by 1, and a value of $d_i$ is obtained.

A3: it is determined whether the values of $d_i$ and $d_1$ are equal, A4 is performed when $d_i=d_1$, and A5 is performed when $d_i \neq d_1$.

A4: it is set that j=i, and A2 is performed.

A5: it is determined whether |i−j| is greater than t, when |i−j|>t, A6 is performed, and when |i−j|≤t, A2 is performed, where t is configured to represent a tolerance value.

A6: it is set that j=i, s is incremented by 1, $d_i=1-d_i$, and A2 is performed.

A7: A2 is performed when s<b, and it is determined that the image of the detection region includes the chip code image when s≥b, where b is configured to represent a required number of standard amplitudes, and s is configured to represent a counted number of amplitudes in current position.

A large enough amplitude difference exists between the signal strengths, the amplitude difference is a standard amplitude. When a sufficient number of standard amplitudes exist in the image of the detection region, a chip code image exists in the image of the detection region.

When the image of the detection region includes a chip code image, the operation in block 105 is performed to identify a chip code corresponding to the chip code image and store the chip code in the database. When the image of the detection region includes no chip code image, it is determined whether an image of a next detection region includes a chip code image.

At block 105, a chip code corresponding to chip code image is identified and the chip code is stored in the database.

It should be noted that some chip codes may be extremely small in size, such as 4 mm*4 mm, then it is difficult to identify the chip codes. Further, in gray level images, the average brightness difference between the codes and background is only 8 gray values, and then it is difficult to identify the chip codes.

According to an embodiment, before identifying the chip code corresponding to the chip code image, the method for chip collection further includes the following operations.

The image of the detection region corresponding to the chip code image is obtained, the image of the detection region is magnified to magnify the chip code image, and the magnified chip code image is obtained. In an example, the image of the detection region may be magnified by 1 time, 1.5 times, 2 times, etc. Specifically, the specific magnification may be manually set for a system. The chip code image is identified after magnification, thereby improving the rate of identifying the code.

Compared with the related art, the image to be detected includes multiple chips, and the chip position information of the image to be detected is obtained through the chip position information of the comparison image with the highest matching degree with the image to be detected in the database, and the position of the detection region in the image to be detected is obtained. That is, the chip position information of the multiple chips in the image to be detected is obtained through the chip position information of the comparison image in the database, the positions of the multiple chips in the image to be detected are automatically obtained, and then it is determined whether the image of the detection region includes a chip code according to the image of the detection region. Therefore, the multiple chip codes are identified simultaneously, and the multiple chips in the image to be detected are identified automatically, thereby saving the detection time of the chips and contributing to the batch output of the chips.

The foregoing operations are divided only for clear description. Multiple operations may be combined into one operation or one operation may be split into multiple operations when the method is performed, as long as the operations include the same logical relationship, they are all within the scope of the disclosure. Adding insignificant modification to the process or introducing insignificant designs without changing the core design of the process is within the scope of the disclosure.

Another embodiment of the disclosure relates to a method for chip collection. Different from the foregoing embodiments, according to the embodiment, the chip code is binarized before the chip code is stored, thereby improving the efficiency of storing the chip code.

Figure 5:
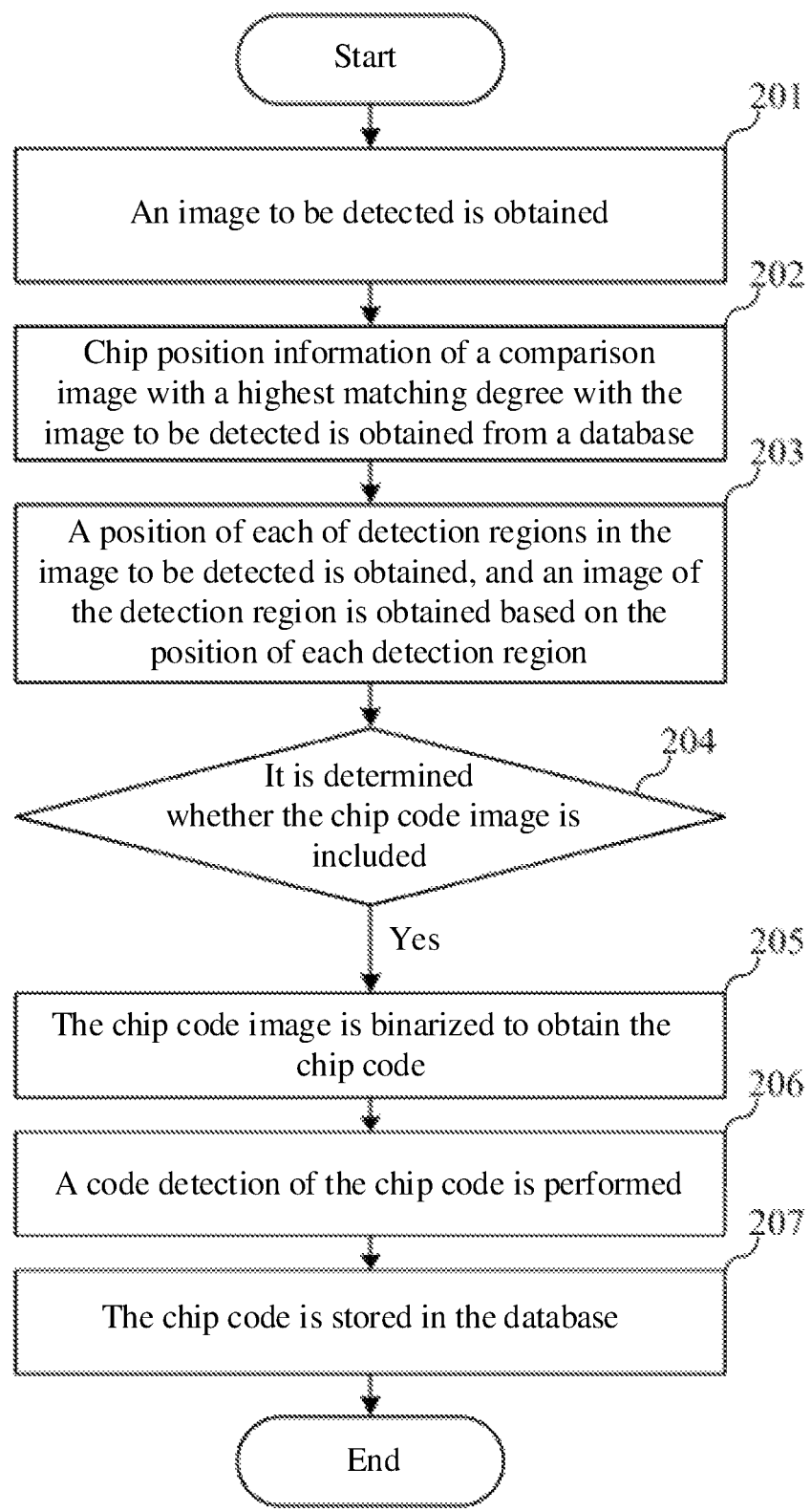
FIG. 5 is a schematic flowchart of a method for chip collection according to another embodiment of the disclosure.

FIG. 5 is a schematic flowchart of the method for chip collection according to the embodiment. The method for chip collection according to the embodiment will be illustrated in detail below with reference to the drawings, and the same or corresponding parts as and to those according to the foregoing embodiments will not be illustrated in detail below.

With reference to FIG. 5, the method for chip collection includes the following operations.

At block 201, an image to be detected is obtained.

At block 202, chip position information of a comparison image with a highest matching degree with the image to be detected is obtained from a database.

At block 203, a position of each of detection regions in the image to be detected is obtained, and an image of the detection region is obtained based on the position of each detection region.

At block 204, it is determined whether a chip code image is included.

When the image of the detection region includes a chip code image, the operation in block 205 is performed. The chip code image is binarized to obtain the chip code. When the image of the detection region includes no chip code image, it is determined whether an image of a next detection region includes a chip code image.

At block 205, the chip code image is binarized to obtain the chip code.

The chip code image is binarized to obtain the chip code corresponding to the chip code image. By finding out an optimal threshold, the chip code image is transformed into a binarized image, so as to effectively remove the non-code region and effectively classify the information of 0 and 1 in the code images, thereby improving the success rate of chip collection.

Specifically, the operation that the chip code image is binarized includes the following operations.

The image of the detection region where the chip code image is located is obtained, to obtain x configured to represent a total number of pixels in the image of the detection region where the chip code image is located.

w and e are obtained, where e=w*x, e is configured to represent a binarization evaluation value, and w is configured to represent a preset binarization evaluation percentage.

A first accumulated value of the signal strength of the chip code image from low to high is obtained; and when the first accumulated value is not less than e, $k_1$ configured to represent a first position for obtaining a binarization threshold is obtained.

A second accumulated value of the signal strength of the chip code image from high to low is obtained; and when the second accumulated value is not less than e, $k_2$ configured to represent a second position for obtaining the binarization threshold is obtained.

m is obtained, where m=$(k_1+k_2)$/2, and m is configured to represent the binarization threshold.

A code identifier with a signal strength greater than m is calibrated to be 1, and a code identifier with a signal strength not greater than m is calibrated to be 0.

At block 206, a code detection is performed on the chip code.

According to the embodiment, the method for chip collection further includes the following operations. After identifying the chip code corresponding to the chip code image and before storing the chip code in the database, a code detection is performed on the chip code, and operation in block 207 is performed, that is, the chip code is stored in the database, when the chip code conforms to a code detection rule for the code detection.

Specifically, the operation of performing the code detection on the chip code includes the following operation. It is determined whether a length of the chip code is a compliant length, and it is determined whether each character of the chip code is a compliant character.

In an example, when collecting the chip codes, the collection may be successful but the code is misjudged, therefore it is necessary to perform the code detection on the obtained chip code. When the chip code conforms to the code detection rule of the database, the chip code is a compliant code; otherwise, the chip code is a non-compliant code.

Specifically, a compliant length of a code string is defined, and the compliant length refers to a range, such as [13, 20, 22-25]: the length of "13", "20" or "between 22 and 25" fall within the compliant length. Character forms are defined, such as English letters, decimal digits, hexadecimal digits, etc., such as [B-G, Z, h-k; 1-3, 7, 9; 0-F; 3-B] which denotes that ";" is configured to separate the character rules, and the rule is only applicable when the chip code is a four-character code string, the first range of the compliant character includes English letters between uppercase letters B to G or Z or lowercase letters h to k, the second range of the compliant character includes decimal digits between 1 to 3 or 7 or 9, the third range of the compliant character includes hexadecimal digits between 0 to 9 or A-F, and the fourth range of the compliant character includes hexadecimal digits between 3 to 9 or A-B.

At block 207, the chip code is stored in the database.

The foregoing operations are divided only for clear description. Multiple operations may be combined into one operation or one operation may be split into multiple operations when the method is performed, as long as the operations include the same logical relationship, they are all within the scope of the disclosure. Adding insignificant modification to the process or introducing insignificant designs without changing the core design of the process is within the scope of the disclosure.

Due to the fact that the above-mentioned embodiments correspond to the present embodiment, the present embodiment may be implemented in cooperation with the above-mentioned embodiments. The related technical details mentioned in the above-mentioned embodiments are further applicable to this embodiment, and the technical effects achieved in the above-mentioned embodiments may also be implemented in this embodiment, which will not be repeated herein. Accordingly, the related technical details mentioned in the embodiment may further be applicable to the above-mentioned embodiments.

Another embodiment of the disclosure provides a method for chip positioning, including the following operations: obtaining an image to be positioned based on a positioning device; dividing the image to be positioned into regions to obtain multiple sub-positioning images, with a chip in each sub-positioning image; obtaining the position of the chip in each sub-positioning image; and obtaining chip position information of the image to be positioned based on the position of the chip in each sub-positioning image and the position of each sub-positioning image in the image to be positioned.

Figure 6:
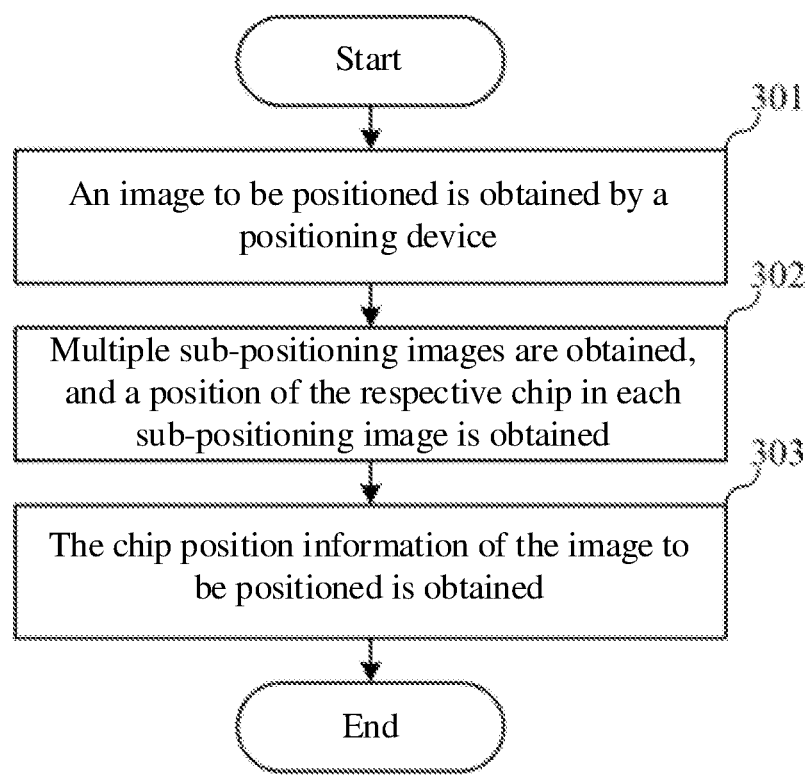
FIG. 6 is a schematic flowchart of a method for chip positioning according to another embodiment of the disclosure.
Figure 7:
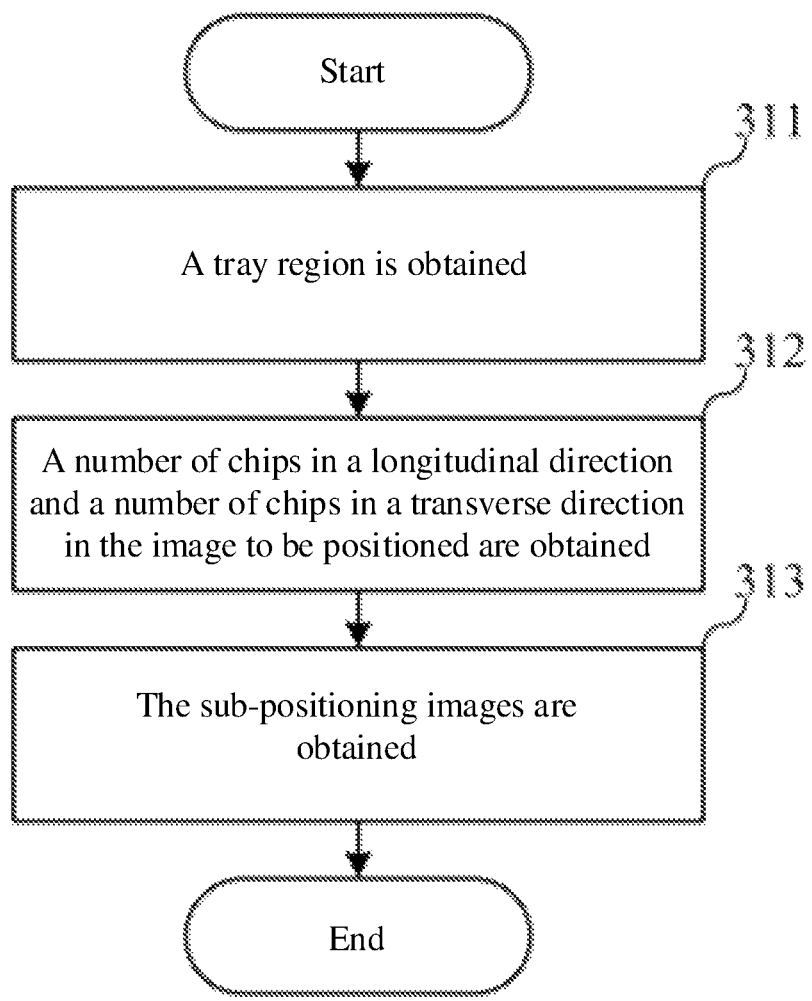
FIG. 7 is a schematic flowchart for obtaining sub-positioning images according to another embodiment of the disclosure.

FIG. 6 is a schematic flowchart of the method for chip positioning according to the embodiment, and FIG. 7 is a schematic flowchart for obtaining sub-positioning images according to the embodiment. The method for chip positioning according to the embodiment of the disclosure will be illustrated in detail below with reference to the drawings.

With reference to FIG. 6, the method for chip positioning includes the following operations.

At block 301, the image to be positioned is obtained by a positioning device.

At block 302, multiple sub-positioning images are obtained, and a position of the respective chip in each sub-positioning image is obtained.

The image to be positioned is divided into regions to obtain multiple sub-positioning images, where each sub-positioning image includes a chip, and the position of the chip in each sub-positioning image is obtained.

With reference to FIG. 7, the operation for dividing the image to be positioned into regions to obtain multiple sub-positioning images includes the following operations.

At block 311, a tray region is obtained.

The tray region is obtained based on a tray outer frame in the image to be positioned.

In an example, the tray chip image obtained by a current camera is obtained, and a user interface is presented to render the obtained tray chip image as the background.

A tray region is divided into equal regions, and multiple sub-positioning images with the same size are obtained. The operation for dividing the tray region into equal regions includes the following operations.

At block 312, a number of chips in a longitudinal direction and a number of chips in a transverse direction in the image to be positioned are obtained.

Specifically, the number of the longitudinal chips and the number of the transverse chips in the image to be positioned are obtained, and the tray region is equally and longitudinally divided based on the number of the chips in the longitudinal direction, and the tray region is equally and transversely divided based on the number of the chips in the transverse direction.

At block 313, the sub-positioning images are obtained.

In an example, the tray outer frame may be selected on the user interface with a mouse; the number of the chips in the longitudinal direction and the number of the chips in the transverse direction (v, c) on the tray are keyed in; the tray outer frame is longitudinally divided into v equal segments, and the tray outer frame is transversely divided into c equal segments to obtain v*c sub-positioning images with the same area; and the sub-positioning images are sequentially numbered from 1 to v*c in the chip region from top-left to bottom-right rule.

Further with reference to FIG. 6, the operation in block 303 includes that the chip position information of the image to be positioned is obtained.

The chip position information of the image to be positioned is obtained based on the position of the respective chip in each sub-positioning image and a position of each sub-positioning image in the image to be positioned.

Compared with the related art, the image to be positioned is obtain by the positioning device, the image to be positioned is divided into regions to obtain the chip position information of the image to be positioned, then the chip position information of the image to be positioned is stored in the database as chip position information of a comparison image, and subsequently, when the method for chip collection is performed, the chip position information of the image to be positioned is mapped to the image to be detected through the matching degree between the image to be detected and the comparison image. Therefore, the codes of the chips on the chip tray are automatically collected, thereby saving the detection time of the chips and contributing to the batch output of the chips.

The foregoing operations are divided only for clear description. Multiple operations may be combined into one operation or one operation may be split into multiple operations when the method is performed, as long as the operations include the same logical relationship, they are all within the scope of the disclosure. Adding insignificant modification to the process or introducing insignificant designs without changing the core design of the process is within the scope of the disclosure.

Another embodiment of the disclosure provides a method for chip positioning. Different from the previous embodiment, in this embodiment, in the process for obtaining the chip position information of the image to be positioned based on sub-positioning images, a two-dimensional code image in each sub-positioning image is obtained based on the sub-positioning image, and then the chip position information of the image to be positioned is obtained through the multiple two-dimensional code images in the multiple sub-positioning images, thereby greatly reducing the image analysis range, effectively improving the processing speed and eliminating the interference from background factors, and effectively improving the accuracy to reduce the data processing load on obtaining the chip position information.

Figure 8:
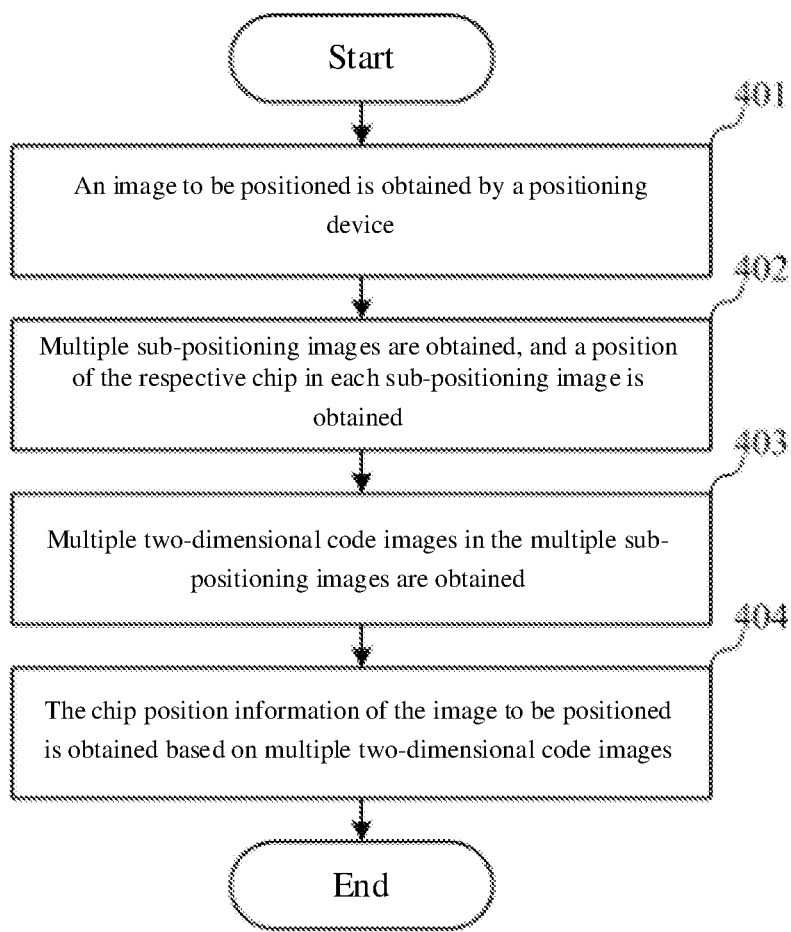
FIG. 8 is a schematic flowchart of a method for chip positioning according to another embodiment of the disclosure.
Figure 9:
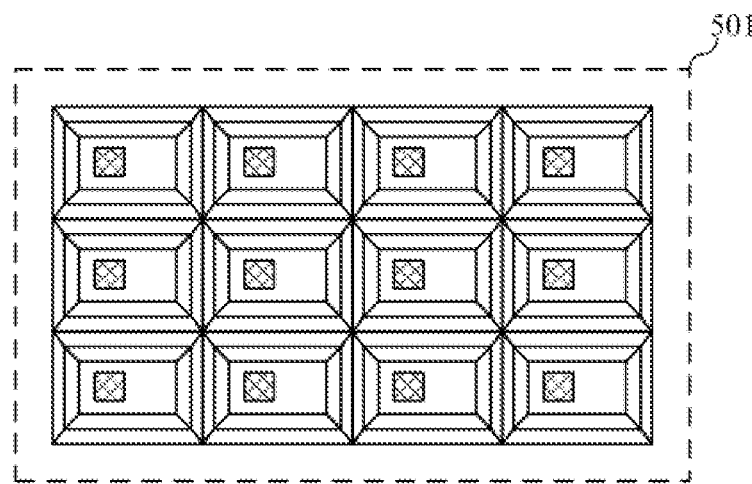
FIG. 9 is a schematic diagram of an image to be positioned according to another embodiment of the disclosure.
Figure 10:
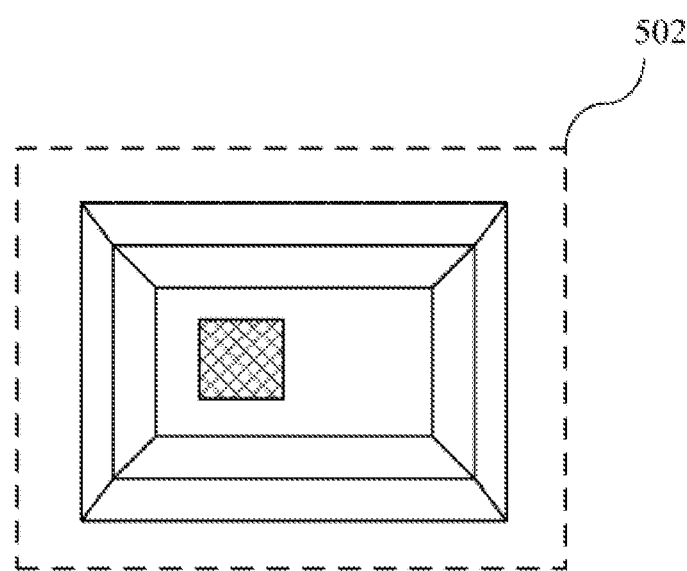
FIG. 10 is a schematic diagram of a sub-positioning image according to another embodiment of the disclosure.
Figure 11:
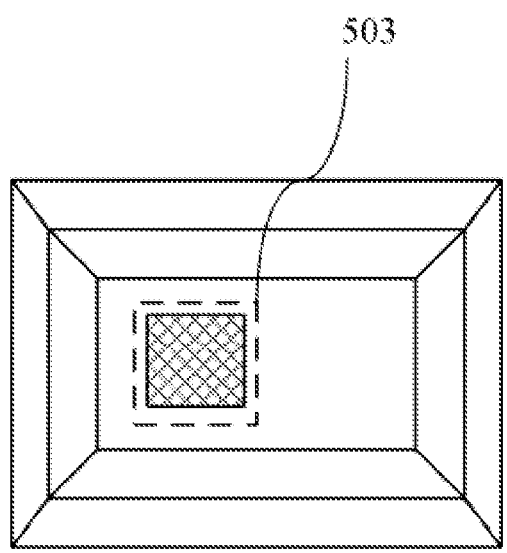
FIG. 11 is a schematic diagram of a two-dimensional code image according to another embodiment of the disclosure.

FIG. 8 is a schematic flowchart of the method for chip positioning according to the embodiment, FIG. 9 is a schematic diagram of an image to be positioned according to the embodiment, FIG. 10 is a schematic diagram of a sub-positioning image according to the embodiment, and FIG. 11 is a schematic diagram of a two-dimensional code image according to the embodiment. The method for chip positioning according to the embodiment will be illustrated in detail below with reference to the drawings, and the same or corresponding parts as and to those according to the foregoing embodiment will not be illustrated in detail below.

With reference to FIG. 8, the method for chip positioning includes the following operations.

At block 401, an image to be positioned is obtained by a positioning device.

With reference to FIG. 10, a sub-positioning image 502 is obtained based on the image to be positioned 501 as shown in FIG. 9.

Further with reference to FIG. 8, the operation in block 402 includes that multiple sub-positioning images are obtained, and a position of the respective chip in each sub-positioning image is obtained.

At block 403, multiple two-dimensional code images in multiple sub-positioning images are obtained.

With reference to FIG. 11, the two-dimensional code image 503 is obtained based on the corresponding sub-positioning image 502 as shown in FIG. 10.

Specifically, the two-dimensional code image in each sub-positioning image is obtained based on the position of the respective chip in each sub-positioning image, and each two-dimensional code image is configured to cover only the position of the respective chip.

Specifically, the sub-positioning images are simultaneously adjusted in size and position to obtain adjusted images. When it is determined that no non-chip code image exists in a region covered by each adjusted image and each adjusted image covers a respective chip code image, the adjusted image is set to be the two-dimensional code image.

More specifically, the multiple sub-positioning images are simultaneously adjusted in size based on at least one of a zoom-in instruction or a zoom-out instruction, so that no non-chip code image exists in the region covered by each adjusted image. The multiple sub-positioning images are simultaneously adjusted in position based on a direction control instruction, so that each adjusted image covers the respective chip code image.

At block 404, the chip position information of the image to be positioned is obtained based on multiple two-dimensional code images.

The operation for obtaining the chip position information of the image to be positioned based on the position of the respective chip in each sub-positioning image and the position of each sub-positioning image in the image to be positioned includes the following operations. The chip position information of the image to be positioned is obtained based on multiple two-dimensional code images. The chip position information includes multiple two-dimensional code images and positions of the multiple two-dimensional code images in the image to be positioned.

In an example, the region of a sub-positioning image is modified to be in a shape of square, the side length of the square is a minimum value of the side length of the sub-positioning image, then, the square region is an image to be adjusted, and the image is adjusted by controlling a "+" key or "−" key of a keyboard, so that all the images to be adjusted may be magnified or minified simultaneously, and each two-dimensional code region is controlled by a direction key of the keyboard, and all the two-dimensional code regions are simultaneously adjusted in position, until the images cover all the chip codes.

The foregoing operations are divided only for clear description. Multiple operations may be combined into one operation or one operation may be split into multiple operations when the method is performed, as long as the operations include the same logical relationship, they are all within the scope of the disclosure. Adding insignificant modification to the process or introducing insignificant designs without changing the core design of the process is within the scope of the disclosure.

It should be understood by those of ordinary skill in the art that, the foregoing embodiments are specific embodiments for implementing the disclosure, and in practical application, variations in form and detail may be made thereto without departing from the spirit and scope of the disclosure.

The invention claimed is:

1. A method for chip collection, comprising:
   obtaining an image to be detected, wherein the image to be detected comprising chip code images, and each chip code image is configured to identify a respective one of semiconductor chips;
   obtaining, from a database, chip position information of a comparison image with a highest matching degree with the image to be detected, wherein the chip position information is configured to indicate a position of each semiconductor chip in the comparison image;
   obtaining, based on the chip position information, a position of each of detection regions in the image to be detected, wherein each detection region is configured to indicate a position of a respective one of the chip code images;
   obtaining, based on the position of each detection region, an image of the detection region;
   determining whether the image of the detection region comprises the chip code image; and
   in response to determining that the image of the detection region comprises the chip code image, identifying a chip code corresponding to the chip code image and storing the chip code in the database.

2. The method of claim 1, wherein determining whether the image of the detection region comprises the chip code image comprises:
   obtaining the image of the detection region, wherein the image of the detection region comprises a code identifier;
   generating, based on a position of the code identifier and signal strength of the code identifier, a relationship map between the position of the code identifier and the signal strength of the code identifier; and
   determining whether the code identifier in the image of the detection region is the chip code image based on a signal strength difference between the signal strength of the code identifier in the relationship map and signal strength of the code identifier at a preset position.

3. The method of claim 2, wherein generating, based on the position of the code identifier and the signal strength of the code identifier, the relationship map between the position of the code identifier and the signal strength of the code identifier comprises:

setting, in the image of the detection region, a signal vector for analyzing the code identifier;
obtaining the signal strength of the code identifier on the signal vector; and
obtaining the relationship map between the position of the code identifier and the signal strength of the code identifier based on the signal vector and the signal strength of the code identifier on the signal vector.

4. The method of claim 2, wherein determining whether the code identifier in the image of the detection region is the chip code image based on the signal strength difference between the signal strength of the code identifier in relationship map and the signal strength of the code identifier at the preset position comprises:
   setting that $d_i=1$ when $a_i$ is greater than $a_j$, and $d_i=0$ when $a_i$ is not greater than $a_j$, wherein i is configured to represent a sequential position index value, j is configured to represent a current position index value, $a_n$ is configured to represent signal strength of a code identifier position n, and $d_n$ is configured to represent a determination value of the code identifier position n;
   A1: in an initial state, setting that i=1 and j=1, and obtaining a value of $d_1$ based on $a_0$ and $a_1$,
   A2: incrementing i by 1, and obtaining a value of $d_i$,
   A3: determining whether the values of $d_i$ and $d_1$ are equal, and performing A4 when $d_i=d_1$, and performing A5 when $d_i \neq d_1$,
   A4: setting that j=i, and performing A2,
   A5: determining whether |i−j| is greater than t, performing A6 when |i−j|>t, and performing A2 when |i−j|≤t, wherein t is configured to represent a tolerance value,
   A6: setting that j=i, s is incremented by 1, and $d_i=1-d_i$, performing A2,
   A7: performing A2 when s<b, and determining that the image of the detection region comprises the chip code image when s≥b, wherein b is configured to represent a required number of standard amplitudes, and s is configured to represent a counted number of amplitudes in current position.

5. The method of claim 1, further comprising: before determining whether the image of the detection region comprises the chip code image,
   determining whether the image of the detection region comprises a code identifier; and
   in response to determining that the image of the detection region comprises the code identifier, determining whether the image of the detection region comprises the chip code image; and
   wherein determining whether the image of the detection region comprises the chip code image comprises: determining whether the code identifier is the chip code image.

6. The method of claim 1, wherein identifying the chip code corresponding to the chip code image and storing the chip code in the database comprises:
   binarizing the chip code image to obtain the chip code corresponding to the chip code image; and
   storing the chip code in the database.

7. The method of claim 6, wherein binarizing the chip code image comprises:
   obtaining the image of the detection region where the chip code image is located, to obtain x configured to represent a total number of pixels in the image of the detection region where the chip code image is located;

obtaining w and e, wherein e=w*x, e is configured to represent a binarization evaluation value, and w is configured to represent a preset binarization evaluation percentage;

obtaining a first accumulated value of signal strengths of the chip code image from low to high, and when the first accumulated value is not less than e, obtaining $k_1$ configured to represent a first position for obtaining a binarization threshold;

obtaining a second accumulated value of signal strength of the chip code image from high to low, when the second accumulated value is not less than e, obtaining $k_2$ configured to represent a second position for obtaining the binarization threshold;

obtaining m, wherein m=$(k_1+k_2)/2$, and m is configured to represent the binarization threshold; and calibrating a code identifier with a signal strength greater than m to be 1, and calibrating the code identifier with the signal strength not greater than m to be 0.

8. The method of claim 1, further comprising: after identifying the chip code corresponding to the chip code image, and before storing the chip code in the database,
performing a code detection on the chip code; and
in response to the chip code conforming to a code detection rule for the code detection, storing the chip code in the database.

9. The method of claim 8, wherein performing the code detection on the chip code comprises:
determining whether a length of the chip code is a compliant length; and
determining whether each character of the chip code is a compliant character.

10. The method of claim 1, further comprising: before identifying the chip code corresponding to the chip code image,
obtaining the image of the detection region corresponding to the chip code image;
magnifying the image of the detection region to magnify the chip code image; and
obtaining the magnified chip code image.

11. A method for chip positioning, for obtaining the chip position information in the method for chip collection of claim 1, comprising:
obtaining, by a positioning device, an image to be positioned;
dividing the image to be positioned into regions to obtain a plurality of sub-positioning images, wherein each sub-positioning image comprises a respective chip;
obtaining a position of the respective chip in each sub-positioning image; and
obtaining the chip position information of the image to be positioned based on the position of the respective chip in each sub-positioning image and a position of each sub-positioning image in the image to be positioned.

12. The method of claim 11, wherein dividing the image to be positioned into regions to obtain the plurality of sub-positioning images comprises:

obtaining a tray region based on a tray outer frame in the image to be positioned; and
dividing the tray region into equal regions to obtain the plurality of sub-positioning images with the same size.

13. The method of claim 12, wherein dividing the tray region into equal regions comprises:
obtaining a number of chips in a longitudinal direction and a number of chips in a transverse direction in the image to be positioned;
equally and longitudinally dividing the tray region based on the number of the chips in the longitudinal direction; and
equally and transversely dividing the tray region based on the number of the chips in the transverse direction.

14. The method of claim 11, further comprising: after obtaining the position of the respective chip in each sub-positioning image,
obtaining, based on the position of the respective chip in each sub-positioning image, a two-dimensional code image in the sub-positioning image, wherein the two-dimensional code image is configured to cover only the position of the respective chip; and
wherein obtaining the chip position information of the image to be positioned based on the position of the respective chip in each sub-positioning image and the position of each sub-positioning image in the image to be positioned comprises:
obtaining the chip position information of the image to be positioned based on a plurality of two-dimensional code images in the plurality of sub-positioning images, wherein the chip position information comprises the plurality of two-dimensional code images and positions of the plurality of two-dimensional code images in the image to be positioned.

15. The method of claim 14, wherein obtaining, based on the position of the respective chip in each sub-positioning image, the two-dimensional code image in the sub-positioning image comprises:
simultaneously adjusting the sub-positioning images in size and position to obtain adjusted images; and
in response to determining that no non-chip code image exists in a region covered by each adjusted image and each adjusted image covers a respective chip code image, setting the adjusted image to be the two-dimensional code image.

16. The method of claim 15, wherein simultaneously adjusting the sub-positioning images in size and position comprises:
simultaneously adjusting the plurality of sub-positioning images in size based on at least one of a zoom-in instruction or a zoom-out instruction, so that no non-chip code image exists in the region covered by each adjusted image; and
simultaneously adjusting the plurality of sub-positioning images in position based on a direction control instruction, so that each adjusted image covers the respective chip code image.

* * * * *